United States Patent
Dong

(10) Patent No.: US 11,727,860 B2
(45) Date of Patent: Aug. 15, 2023

(54) PIXEL CIRCUIT, DISPLAY PANEL, AND DISPLAY DEVICE

(71) Applicant: BOE TECHNOLOGY GROUP CO., LTD., Beijing (CN)

(72) Inventor: Hang Dong, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/271,227

(22) PCT Filed: May 29, 2020

(86) PCT No.: PCT/CN2020/093143
§ 371 (c)(1),
(2) Date: Feb. 25, 2021

(87) PCT Pub. No.: WO2020/253494
PCT Pub. Date: Dec. 24, 2020

(65) Prior Publication Data
US 2021/0327342 A1 Oct. 21, 2021

(30) Foreign Application Priority Data
Jun. 18, 2019 (CN) .......................... 201910524274.3

(51) Int. Cl.
*G09G 3/32* (2016.01)
*G02F 1/163* (2006.01)
(Continued)

(52) U.S. Cl.
CPC ............... *G09G 3/32* (2013.01); *G02F 1/157* (2013.01); *G02F 1/163* (2013.01); *G09G 3/38* (2013.01);
(Continued)

(58) Field of Classification Search
CPC .. G09G 3/00; G09G 3/32; G09G 3/38; G09G 2300/0842; G09G 2310/0275;
(Continued)

(56) References Cited

U.S. PATENT DOCUMENTS

| 7,750,875 | B2 | 7/2010 | Kim et al. |
| 9,111,491 | B2 | 8/2015 | Woo et al. |

(Continued)

FOREIGN PATENT DOCUMENTS

| CN | 1467695 A | 1/2004 |
| CN | 1716370 A | 1/2006 |

(Continued)

OTHER PUBLICATIONS

English Language Machine Translation of JP-07175444A (Year: 1995).*

*Primary Examiner* — Jason M Mandeville
(74) *Attorney, Agent, or Firm* — Chiwin Law LLC

(57) ABSTRACT

The present disclosure provides a pixel circuit, a display panel, and a display device. The pixel circuit includes: a first switch circuit, a second switch circuit, a driving circuit, a first gate line, a first data line, a second gate line, and a second data line. The first switch circuit has a control terminal connected to the first gate line, a first terminal connected to the first data line, and a second terminal connected to a control terminal of the driving circuit; the second switch circuit has a control terminal connected to the second gate line, a first terminal connected to the second data line, and a second terminal connected to the control terminal of the driving circuit; and the first gate line and the second data line extend along a first direction, the second gate line and the first data line extend along a second direction.

19 Claims, 8 Drawing Sheets

(51) Int. Cl.
  *G09G 3/38* (2006.01)
  *G02F 1/157* (2006.01)
(52) U.S. Cl.
  CPC .. *G02F 2001/1635* (2013.01); *G02F 2201/44* (2013.01); *G02F 2201/52* (2013.01); *G02F 2203/30* (2013.01); *G09G 2300/0842* (2013.01); *G09G 2310/0275* (2013.01)
(58) Field of Classification Search
  CPC .. G02F 1/157; G02F 1/163; G02F 2001/1635; G02F 2201/44; G02F 2201/52; G02F 2203/30; H01L 27/3244
  USPC .......................................................... 345/55
  See application file for complete search history.

(56) References Cited

U.S. PATENT DOCUMENTS

| | | | |
|---|---|---|---|
| 11,309,428 B2* | 4/2022 | Song | H01L 29/78603 |
| 2006/0028408 A1 | 2/2006 | Kim | |
| 2006/0055633 A1* | 3/2006 | Koyama | H01L 27/124 |
| | | | 345/55 |
| 2008/0018578 A1 | 1/2008 | Ku | |
| 2008/0068361 A1 | 3/2008 | Miyazawa | |
| 2008/0143648 A1* | 6/2008 | Ishizuka | G09G 3/325 |
| | | | 345/76 |
| 2008/0191966 A1* | 8/2008 | Van Berkel | H04N 13/317 |
| | | | 345/32 |
| 2009/0295772 A1 | 12/2009 | Kim et al. | |
| 2009/0303220 A1* | 12/2009 | You | G09G 3/3233 |
| | | | 345/82 |
| 2011/0227889 A1 | 9/2011 | Choi | |
| 2013/0147694 A1 | 6/2013 | Kim et al. | |
| 2014/0168745 A1* | 6/2014 | Satou | G02F 1/163 |
| | | | 359/266 |
| 2014/0306200 A1* | 10/2014 | Jinta | H01L 27/3246 |
| | | | 257/40 |
| 2016/0035292 A1* | 2/2016 | Lee | G09G 3/3648 |
| | | | 345/694 |
| 2016/0322442 A1 | 11/2016 | Lee et al. | |
| 2016/0322450 A1 | 11/2016 | Lee et al. | |
| 2019/0109240 A1* | 4/2019 | Yu | H01L 27/1288 |
| 2020/0273995 A1* | 8/2020 | Song | H01L 27/1225 |

FOREIGN PATENT DOCUMENTS

| | | | |
|---|---|---|---|
| CN | 101093639 A | 12/2007 | |
| CN | 101110203 A | 1/2008 | |
| CN | 101593767 A | 12/2009 | |
| CN | 103165079 A | 6/2013 | |
| CN | 103886831 A | 6/2014 | |
| CN | 110085165 A | 8/2019 | |
| JP | 07175444 A | * 7/1995 | ............... G09G 3/36 |

\* cited by examiner

//PIXEL CIRCUIT, DISPLAY PANEL, AND DISPLAY DEVICE

CROSS-REFERENCE TO RELATED APPLICATION

This application is a U.S. National Phase Entry of International Application No. PCT/CN2020/093143 filed on May 29, 2020, designating the United States of America and claiming priority to Chinese Patent Application No. 201910524274.3, filed on Jun. 18, 2019. The present application claims priority to and the benefit of the above-identified applications and the above-identified applications are incorporated by reference herein in their entirety.

TECHNICAL FIELD

The embodiments of the present disclosure relate to a pixel circuit, a display panel, and a display device.

BACKGROUND

Flat panel displays (FPD) have become the mainstream products in the market, and there are more and more kinds of the FPD, such as a liquid crystal display (LCD), an organic light-emitting diode (OLED) display, a plasma display panel (PDP), and a field emission display (FED), etc.

At present, the shapes of the mainstream display panels are mostly rectangular, and the display panels are mainly divided into two designs, that is, a portrait and a landscape. After the product production is completed, the design of portrait and the design of landscape need to correspond to video sources with different resolutions, respectively, which can't be switched, and the freedom and flexibility of the production design are poor.

SUMMARY

An embodiment of the present disclosure provides a pixel circuit, comprising: a first switch circuit, a second switch circuit, a driving circuit, a first gate line, a first data line, a second gate line, and a second data line. A control terminal of the first switch circuit is connected to the first gate line, a first terminal of the first switch circuit is connected to the first data line, and a second terminal of the first switch circuit is connected to a control terminal of the driving circuit; a control terminal of the second switch circuit is connected to the second gate line, a first terminal of the second switch circuit is connected to the second data line, and a second terminal of the second switch circuit is connected to the control terminal of the driving circuit; the driving circuit is connected to a light-emitting element, and is configured to drive the light-emitting element to emit light; and the first gate line and the second data line extend along a first direction, the second gate line and the first data line extend along a second direction, and the first direction and the second direction cross each other.

In a possible implementation, the first gate line and the second data line are a same signal line.

In a possible implementation, the second gate line and the first data line are a same signal line.

In a possible implementation, the driving circuit is further connected to a power supply line, and the power supply line comprises a first branch extending along the first direction and a second branch extending along the second direction.

In a possible implementation, the pixel circuit further comprises a storage circuit, a first terminal of the storage circuit is connected to the control terminal of the driving circuit, and a second terminal of the storage circuit is connected to a first terminal of the driving circuit.

In a possible implementation, the first switch circuit comprises a first switch transistor, the second switch circuit comprises a second switch transistor, the driving circuit comprises a driving transistor, and the storage circuit comprises a capacitor. A gate electrode of the first switch transistor serves as the control terminal of the first switch circuit, a first electrode of the first switch transistor serves as the first terminal of the first switch circuit, and a second electrode of the first switch transistor serves as the second terminal of the first switch circuit; a gate electrode of the second switch transistor serves as the control terminal of the second switch circuit, a first electrode of the second switch transistor serves as the first terminal of the second switch circuit, and a second electrode of the second switch transistor serves as the second terminal of the switch circuit; a gate electrode of the driving transistor serves as the control terminal of the driving circuit, a first electrode of the driving transistor is connected to a power supply line, and a second electrode of the driving transistor is connected to the light-emitting element; and a first terminal of the capacitor serves as the first terminal of the storage circuit, and a second terminal of the capacitor serves as the second terminal of the storage circuit.

In a possible implementation, the first switch transistor is a double-gate switch transistor, or the second switch transistor is a double-gate switch transistor, or both the first switch transistor and the second switch transistor are double-gate switch transistors.

In a possible implementation, the first switch transistor comprises a first drain electrode doped region, a second drain electrode doped region, and a channel region, and the second switch transistor comprises a first drain electrode doped region, a second drain electrode doped region, and a channel region. Compared with the first drain electrode doped region of the first switch transistor, the second drain electrode doped region of the first switch transistor is closer to the channel region of the first switch transistor; compared with the first drain electrode doped region of the second switch transistor, the second drain electrode doped region of the second switch transistor is closer to the channel region of the first switch transistor; and a doping concentration of the second drain electrode doped region of the first switch transistor is lower than a doping concentration of the first drain electrode doped region of the first switch transistor, or a doping concentration of the second drain electrode doped region of the second switch transistor is lower than a doping concentration of the first drain electrode doped region of the second switch transistor; or the doping concentration of the second drain electrode doped region of the first switch transistor is lower than the doping concentration of the first drain electrode doped region of the first switch transistor, and the doping concentration of the second drain electrode doped region of the second switch transistor is lower than the doping concentration of the first drain electrode doped region of the second switch transistor.

An embodiment of the present disclosure further provides a display panel, comprising a pixel array, the pixel array comprises a plurality of pixel units arranged in a plurality of rows and columns, and each pixel unit of the plurality of pixel units comprises the pixel circuit provided in the embodiments of the present disclosure.

In a possible implementation, pixel units arranged in a same row along the first direction share a same first gate line and a same second data line, and pixel units arranged in a same column along the second direction share a same second gate line and a same first data line.

In a possible implementation, each pixel unit of the plurality of pixel units further comprises the light-emitting element, the light-emitting element comprises an anode, and a pattern of the anode is circular, square, rectangular, or diamondoid.

In a possible implementation, light-emitting elements, which emit light of a same color, in different pixel units of the plurality of pixel units are symmetrically distributed about a first axis, and the first axis is an angular bisector of an included angle formed by the first direction and the second direction crossing with each other.

In a possible implementation, the display panel has a plurality of rectangular light-emitting regions. Each rectangular light-emitting region comprises two pixel units emitting red light, two pixel units emitting blue light, and one pixel unit emitting green light, each rectangular light-emitting region has two first end points located at two ends of a first diagonal of each rectangular light-emitting region and two second end points located at two ends of a second diagonal of each rectangular light-emitting region, light-emitting elements in the two pixel units emitting the red light are at the two first end points of each rectangular light-emitting region, respectively, light-emitting elements in the two pixel units emitting the blue light are at the two second end points of each rectangular light-emitting region, respectively, and a light-emitting element in the pixel unit emitting the green light is at a central position of each rectangular light-emitting region.

In a possible implementation, the light-emitting element of each pixel unit is a light-emitting element emitting white light, and an electrochromic layer is correspondingly disposed on a light-emitting side of the light-emitting element of each pixel unit.

In a possible implementation, the electrochromic layer comprises a first electrochromic sub-layer and a second electrochromic sub-layer, and a color displayed by the first electrochromic sub-layer in a case where the first electrochromic sub-layer is powered on is different from a color displayed by the second electrochromic sub-layer in a case where the second electrochromic sub-layer is powered on.

An embodiment of the present disclosure further comprises a display device, comprising the display panel provided in the embodiments of the present disclosure.

In a possible implementation, the display device further comprises a first gate driving chip, a first source driving chip, a second gate driving chip, and a second source driving chip. The first gate driving chip is connected to the first gate line, and is configured to load a gate scanning signal to the first gate line under a first preset condition; the first source driving chip is connected to the first data line, and is configured to load a first data signal to the first data line under the first preset condition; the second gate driving chip is connected to the second gate line, and is configured to load a second gate scanning signal to the second gate line under a second preset condition; and the second source driving chip is connected to the second data line, and is configured to load a second data signal to the second data line under the second preset condition.

In a possible implementation, the display device further comprises a gate driving chip and a source driving chip, the gate driving chip is connected to the first gate line and the second gate line, and is configured to load a gate scanning signal to the first gate line under a first preset condition and configured to load a second gate scanning signal to the second gate line under a second preset condition; and the source driving chip is connected to the first data line and the second data line, and is configured to load a first data signal to the first data line under the first preset condition and load a second data signal to the second data line under the second preset condition.

In a possible implementation, the display device further comprises a driving chip, the driving chip is connected to the first gate line, the first data line, the second gate line, and the second data line, and the driving chip is configured to load a first gate scanning signal to the first gate line and load a first data signal to the first data line under a first preset condition, and is configured to load a second gate scanning signal to the second gate line and load a second data signal to the second data line under a second preset condition.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

FIG. 10A is a schematic diagram of an arrangement structure of pixel units in a case where a first gate line is loaded with a first gate scanning signal and a first data line is loaded with a first data signal provided by embodiments of the present disclosure;

FIG. 10B is a schematic diagram of an arrangement structure of pixel units in a case where a second gate line is loaded with a second gate scanning signal and a second data line is loaded with a second data signal provided by embodiments of the present disclosure;

DETAILED DESCRIPTION

In order to make objects, technical solutions and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments of the present disclosure, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In order to keep the following description of embodiments of the present disclosure clear and concise, detailed descriptions of known functions and known components are omitted in the present disclosure.

Figure 1:
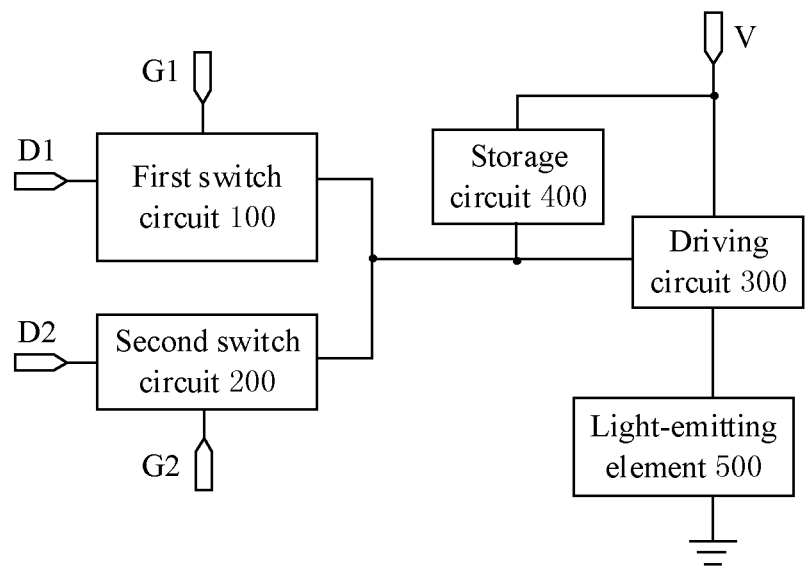
FIG. 1 is a structural schematic diagram of a pixel circuit provided by embodiments of the present disclosure.

FIG. 1 is a structural schematic diagram of a pixel circuit provided by embodiments of the present disclosure. Referring to FIG. 1, the pixel circuit 10 includes a first switch circuit 100, a second switch circuit 200, a driving circuit 300, a first gate line G1, a first data line D1, a second gate line G2, and a second data line D2.

A control terminal of the first switch circuit 100 is connected to the first gate line G1, a first terminal of the first switch circuit 100 is connected to the first data line D1, and a second terminal of the first switch circuit 100 is connected to a control terminal of the driving circuit 300. For example, the first switch circuit 100 is configured to write a first data signal provided by the first data line D1 to the control terminal of the driving circuit 300 under the control of a first gate scanning signal provided by the first gate line G1.

A control terminal of the second switch circuit 200 is connected to the second gate line G2, a first terminal of the second switch circuit 200 is connected to the second data line D2, and a second terminal of the second switch circuit 200 is connected to the control terminal of the driving circuit 300. For example, the second switch circuit 200 is configured to write a second data signal provided by the second data line D2 to the control terminal of the driving circuit 300 under the control of a second gate scanning signal provided by the second gate line G2.

A first terminal of the driving circuit 300 is connected to a power supply line V, and a second terminal of the driving circuit 300 is connected to a first terminal of a light-emitting element 500. For example, the driving circuit 300 is configured to drive the light-emitting element 500 to emit light under the control of the first data signal or the second data signal.

For example, referring to FIG. 1, the pixel circuit further includes a storage circuit 400. A first terminal of the storage circuit 400 is connected to the control terminal of the driving circuit 300, the second terminal of the first switch circuit 100, and the second terminal of the second switch circuit 200, and a second terminal of the storage circuit 400 is connected to the first terminal of the driving circuit 300 and the power supply line V. For example, the storage circuit 400 is configured to store the first data signal or the second data signal to hold the first data signal or the second data signal at the control terminal of the driving circuit 300.

For example, a second terminal of the light-emitting element 500 may be grounded.

Figure 2:
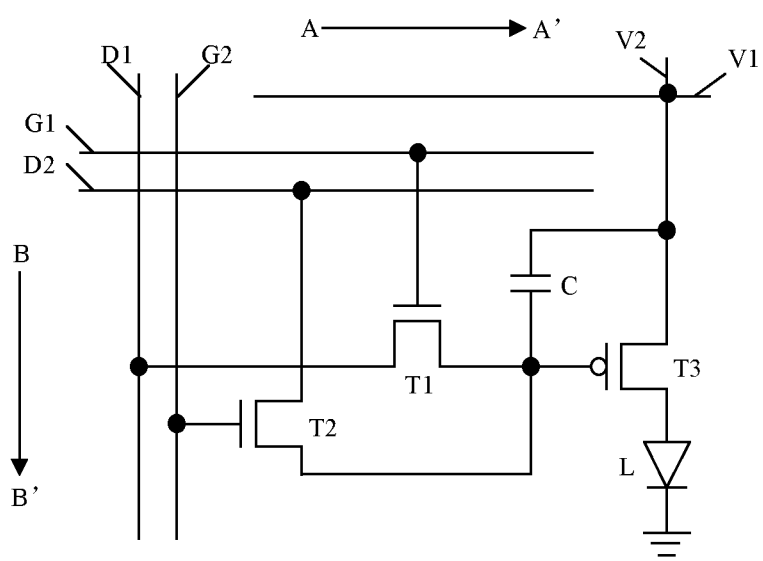
FIG. 2 is a schematic diagram of a circuit structure of the pixel circuit as illustrated in FIG. 1.

FIG. 2 is a schematic diagram of a circuit structure of the pixel circuit as illustrated in FIG. 1. Referring to FIG. 2, in the pixel circuit provided by the embodiment of the present disclosure, the first switch circuit 100 includes a first switch transistor T1, the second switch circuit 200 includes a second switch transistor T2, the driving circuit 300 includes a driving transistor T3, the storage circuit includes a capacitor C, and the first gate line G1 and the second data line D2 extend along a first direction (as indicated by an arrow AA' in the figure), the second gate line G2 and the first data line D1 extend along a second direction (as indicated by an arrow BB' in the figure), the power supply line V includes a first branch V1 extending along the first direction and a second branch V2 extending along the second direction, and the first direction and the second direction cross each other.

For example, referring to FIG. 2, the light-emitting element 500 may be a light-emitting diode L.

A gate electrode of the first switch transistor T1 serves as the control terminal of the first switch circuit 100 and is coupled to the first gate line G1. A first electrode of the first switch transistor T1 serves as the first terminal of the first switch circuit 100 and is coupled to the first data line D1. A second electrode of the first switch transistor T1 serves as the second terminal of the first switch circuit 100 and is coupled to the control terminal of the driving circuit 300 (i.e., a gate electrode of the driving transistor T3).

A gate electrode of the second switch transistor T2 serves as the control terminal of the second switch circuit 200 and is coupled to the second gate line G2. A first electrode of the second switch transistor T2 serves as the first terminal of the second switch circuit 200 and is coupled to the second data line D2. A second electrode of the second switch transistor T2 serves as the second terminal of the second switch circuit 200 and is coupled to the control terminal of the driving circuit 300 (i.e., the gate electrode of the driving transistor T3).

The gate electrode of the driving transistor T3 serves as the control terminal of the driving circuit 300, and is simultaneously coupled to the second electrode of the first switch transistor T1 and the second electrode of the second switch transistor T2, a first electrode of the driving transistor T3 serves as the first terminal of the driving circuit 300 and is coupled to the power supply line V, and a second electrode of the driving transistor T3 is coupled to the first terminal of the light-emitting element 500.

A first terminal of the capacitor C serves as the first terminal of storage circuit 400 and is coupled to the gate electrode of driving transistor T3, the second electrode of first switch transistor T1, and the second electrode of second switch transistor T2, and a second terminal of the capacitor C serves as the second terminal of storage circuit 400 and is coupled to the first electrode of driving transistor T3 and the power supply line V.

The light-emitting element 500 includes a light-emitting diode L, an anode of the light-emitting diode L serves as the first terminal of the light-emitting element 500 and is coupled to the second electrode of the driving transistor T3, and a cathode of the light-emitting diode L serves as the second terminal of the light-emitting element 500 and is grounded.

For example, in some embodiments, the first direction and the second direction are perpendicular to each other, for example, the first direction may be a horizontal direction and the second direction may be a vertical direction, or the first direction may be the vertical direction and the second direction may be the horizontal direction. The present disclosure is described in the following by taking the case that the first direction is the horizontal direction and the second direction is the vertical direction as an example.

It should be noted that the transistors used in the embodiments of the present disclosure may be thin film transistors, field effect transistors, or other switch devices with the same characteristics, and the embodiments of the present disclosure are described by taking the case that all transistors are the thin film transistors as an example. A source electrode and a drain electrode of a transistor used here may be symmetrical in structure, so the source electrode and the drain electrode of the transistor can be structurally indistinguishable. In the embodiment of the present disclosure, in order to distinguish the two electrodes of the transistor except a gate electrode of the transistor, one electrode of the two electrodes is directly described to be a first electrode, and the other electrode of the two electrodes is directly described to be a second electrode.

Figure 3:
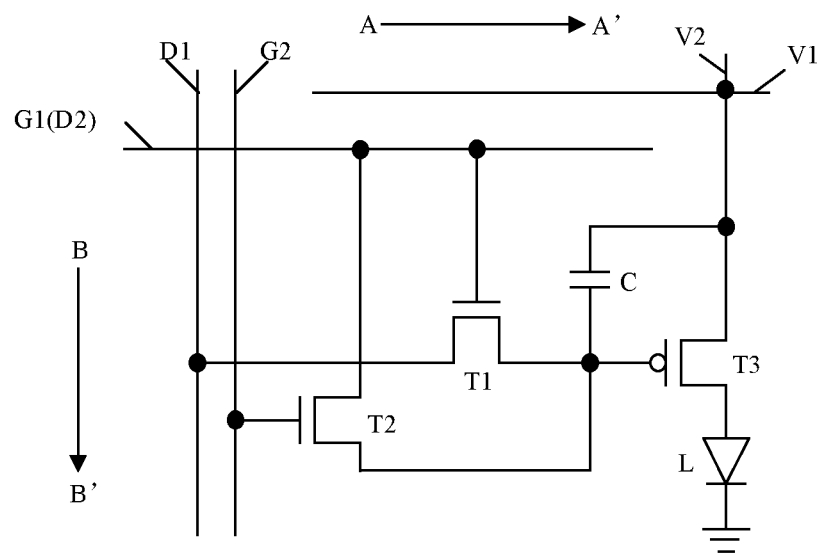
FIG. 3 is a schematic diagram of another circuit structure of the pixel circuit as illustrated in FIG. 1.
Figure 4:
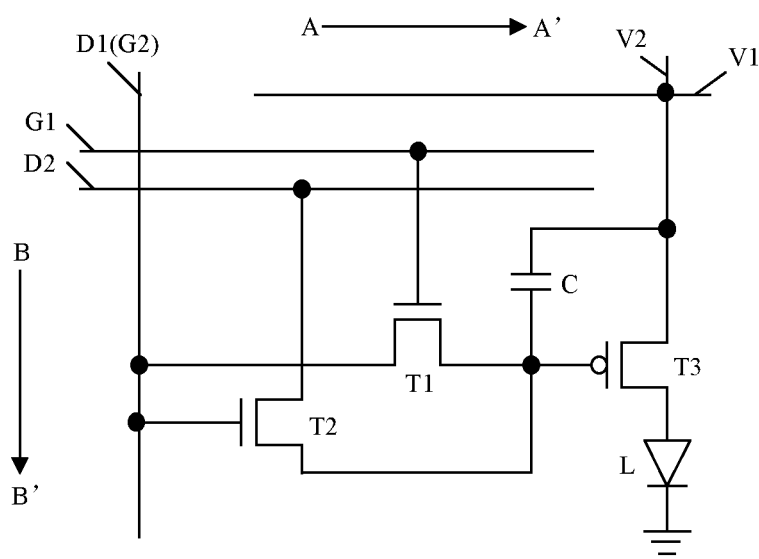
FIG. 4 is a schematic diagram of another circuit structure of the pixel circuit as illustrated in FIG. 1.

In addition, it should be noted that although it is illustrated in FIGS. 2-4 that the first switch transistor T1 and the second switch transistor T2 are N-type transistors and the driving transistor T3 is a P-type transistor, this case is only an example, and the transistors adopted in the embodiments of the present disclosure can all be P-type transistors or N-type transistors, as long as respective electrodes of a selected-type transistor are correspondingly connected in accordance with respective electrodes of a corresponding transistor in the embodiment of the present disclosure, and respective voltage terminals provide the corresponding high voltage or low voltage. For example, for an N-type transistor, its (current) input terminal is a drain electrode, its output terminal is a source electrode, and its control terminal is a gate electrode; and for a P-type transistor, its (current) input terminal is the source electrode, its output terminal is the drain electrode, and its control terminal is the gate electrode. For different types of transistors, the levels of control signals at their control terminals are different. For example, for an N-type transistor, in the case where the control signal is at a high level, the N-type transistor is in a turn-on state; and in the case where the control signal is at a low level, the N-type transistor is in a turn-off state. For a P-type transistor, in the case where the control signal is at a low level, the P-type transistor is in a turn-on state, and in the case where the control signal is at high level, the P-type transistor is in a turn-off state. In the case where an N-type transistor is used, an oxide semiconductor, such as indium gallium zinc oxide (IGZO), can be used as an active layer of the thin film transistor, compared with using low temperature poly silicon (LTPS) or amorphous silicon (such as hydrogenated amorphous silicon) as the active layer of the thin film transistor, it can effectively reduce the size of the transistor and prevent leakage current. The low temperature poly silicon generally refers to the case where the crystallization temperature at which the amorphous silicon is crystallized to obtain poly-silicon is lower than 600 degrees Celsius.

In the pixel circuit provided by the embodiments of the present disclosure, the first gate line and the second data line extend along the first direction, and the second gate line and the first data line extend along the second direction, so that the signal lines extending along the first direction (i.e., the first gate line and the second data line) can transmit not only the gate scanning signal (i.e., the first gate scanning signal transmitted by the first gate line), but also a data grayscale signal (i.e., the second data signal transmitted by the second data line), and the signal lines extending along the second direction (i.e., the second gate line and the first data line) can transmit not only the gate scanning signal (i.e., the second gate scanning signal transmitted by the second gate line), but also the data grayscale signal (i.e., the first data signal transmitted by the first data line). Therefore, in the case where each signal line is electrically connected to a source driving IC (Integrated Circuit) and a gate driving IC, the signal lines extending along the first direction can be connected to both the gate driving IC and the source driving IC, and the signal lines extending along the second direction can also be connected to both the gate driving IC and the source driving IC, that is, the free switch between a horizontal axis function and a vertical axis function (i.e., the switch between Portrait and Landscape is achieved) can be supported, which increases the freedom and flexibility of production design, so that the display panel with manufactured circuit lines can adapt to more video sources, be applied to more application scenarios, and have more display modes.

For example, the first gate line and the second data line may be substantially parallel to each other, and the second gate line and the first data line may be substantially parallel to each other.

In a specific implementation, in an example, the light-emitting diode L can be an organic light-emitting diode (OLED), a quantum dot light-emitting diode (QLED), or the like.

FIG. 3 is a schematic diagram of another circuit structure of the pixel circuit as illustrated in FIG. 1. In a specific implementation, as illustrated in FIG. 3, the first gate line G1 and the second data line D2 are the same signal line. In this case, the gate electrode of the first switch transistor T1 and the first electrode of the second switch transistor T2 may be connected to the same signal line, and the first gate scanning signal and the second data signal may be the same signal, that is to say, the first gate scanning signal may be used as the second data signal. In the embodiment of the present disclosure, the first gate line G1 and the second data line D2 are the same signal line, which can reduce the amount (number) of traces of the display panel in the first direction and reduce the complexity of manufacturing the display panel.

FIG. 4 is a schematic diagram of another circuit structure of the pixel circuit illustrated in FIG. 1. In a specific implementation, as illustrated in FIG. 4, the second gate line G2 and the first data line D1 are the same signal line. In this case, the gate electrode of the second switch transistor T2 and the first electrode of the first switch transistor T1 may be connected to the same signal line, and the second gate scanning signal and the first data signal may be the same signal, that is to say, the first data signal may be used as the second gate scanning signal. In the embodiment of the present disclosure, the second gate line G2 and the first data line D1 are the same signal line, which can reduce the amount of traces of the display panel in the second direction and further reduce the complexity of manufacturing the display panel.

Figure 5:
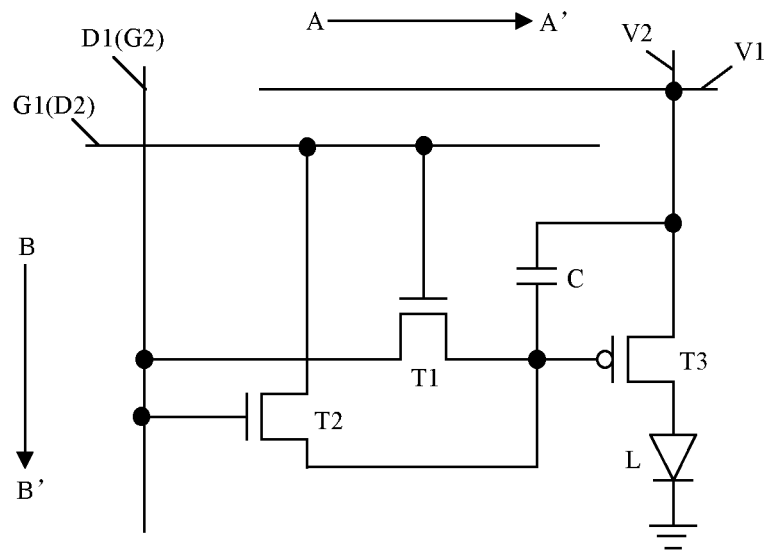
FIG. 5 is a schematic diagram of another circuit structure of the pixel circuit as illustrated in FIG. 1.

FIG. 5 is a schematic diagram of another circuit structure of the pixel circuit illustrated in FIG. 1. In a specific implementation, as illustrated in FIG. 5, the first gate line G1 and the second data line D2 are the same signal line, and at the same time, the second gate line G2 and the first data line D1 are the same signal line. In this case, the gate electrode of the first switch transistor T1 and the first electrode of the second switch transistor T2 may be connected to the same signal line, the gate electrode of the second switch transistor T2 and the first electrode of the first switch transistor T1 may be connected to the same signal line, the first gate scanning signal and the second data signal may be the same signal, and the second gate scanning signal and the first data signal may be the same signal. In the embodiment of the present disclosure, the first gate line G1 and the second data line D2 are the same signal line, and the second gate line G2 and the first data line D1 are the same signal line, which can reduce the amount of traces of the display panel in the first direction and the second direction, and further reduce the complexity of manufacturing the display panel.

In the case where the first gate line G1 and the second data line D2 are the same signal line and the second gate line G2 and the first data line D1 are the same signal line, the first switch transistor T1 and the second switch transistor T2 may both be N-type switch transistors (for example, NMOS), that is, because a threshold voltage Vth of an NMOS switch transistor is generally about 3 volts (V), and the range of the data signal Vdata (for example, the first data signal or the second data signal) is usually below −3v, so that in the case where the horizontal axis function and the vertical axis function are switched, that is, in the case where the signals transmitted by the signal lines extending along the first direction are exchanged with the signals transmitted by the signal lines extending along the second direction, switch transistors that do not need to be in an operation state are in a turn-off state, and thus the normal display will not be affected. For example, as illustrated in FIG. 4, in the case where the signal line G1(D2) extending along the first direction transmits a gate scanning signal (i.e., the first gate scanning signal) and the signal line D1(G2) extending along the second direction transmits a data grayscale signal (i.e., the first data signal), the first switch transistor T1 is turned on, however, because the range of the data grayscale signal transmitted by the signal line D1(G2) extending along the second direction is usually below −3v, which is smaller than a threshold voltage of the second switch transistor T2, the second switch transistor T2 is not turned on, which will not affect the display.

In a specific implementation, as illustrated in FIG. 2, the first gate line G1 and the second data line D2 may also be two independent signal lines, and the second gate line G2 and the first data line D1 may also be two independent signal lines. In the case where the first gate line G1 and the second data line D2 are two independent signal lines and the second gate line G2 and the first data line D1 are two independent signal lines, the first switch transistor T1 and the second switch transistor T2 can be controlled more accurately, and the first switch transistor T1 and/or the second switch transistor T2 can also use P-type switch transistors, so that the first switch transistor T1 and the second switch transistor T2 can be selected more flexibly, and the flexibility of the process manufacturing is higher.

In a specific implementation, as illustrated in FIGS. 2-5, the power supply line V may specifically include a first branch V1 extending along the first direction and a second branch V2 extending along the second direction, that is, the power supply line V is arranged in a mesh shape. In the embodiment of the present disclosure, the power supply line V includes the first branch V1 extending along the first direction and the second branch V2 extending along the second direction, the first branch V1 and the second branch V2 intersect with each other and are electrically connected at an intersection point, so that the power supply line V can also achieve the switch between the horizontal axis function and the vertical axis function, that is to say, during the landscape display, the power signal can be applied along the first direction to pixel circuits (through the first branch V1), and during the portrait display, the power signal can be applied along the second direction to pixel circuits (through the second branch V2).

For example, the first branch V1, the first gate line G1, and the second data line D2 are substantially parallel to each other, and the second branch V2, the second gate line G2, and the first data line D1 are substantially parallel to each other.

In a specific implementation, the first switch transistor T1 and/or the second switch transistor T2 may be double-gate switch transistors. In the embodiments of the present disclosure, the first switch transistor T1 and/or the second switch transistor T2 are double-gate switch transistors, which can reduce the leakage current of the first switch transistor T1 and the leakage current of the second switch transistor T2, and avoid the influence on the display of the display panel due to the large leakage current of a certain switch transistor (the first switch transistor T1 or the second switch transistor T2) that is required to be turned off, in the case where the certain switch transistor is required to be turned off, in the embodiments of the present disclosure. For example, in some embodiments, the double-gate switch transistor can specifically have two gate electrode segments with the same extension length obtained by adjusting the gate electrode of the traditional transistor. The present disclosure includes but is not limited to this case, and the double-gate switch transistor can also have other suitable implementations.

In a specific implementation, the first switch transistor T1 and/or the second switch transistor T2 are lightly doped drain switch transistors. For example, the first switch transistor T1 includes a first drain electrode doped region, a second drain electrode doped region, and a channel region. Compared with the first drain electrode doped region of the first switch transistor T1, the second drain electrode doped region of the first switch transistor T1 is closer to the channel region of the first switch transistor T1, and a doping concentration of the second drain electrode doped region of the first switch transistor T1 is lower than a doping concentration of the first drain electrode doped region T1 of the first switch transistor. For another example, the second switch transistor T2 includes a first drain electrode doped region, a second drain electrode doped region, and a channel region. Compared with the first drain electrode doped region of the second switch transistor T2, the second drain electrode doped region of the second switch transistor T2 is closer to the channel region of the second switch transistor T2, and a doping concentration of the second drain electrode doped region of the second switch transistor T2 is lower than a doping concentration of the first drain electrode doped region of the second switch transistor T2. In the embodiments of the present disclosure, the first switch transistor T1 and/or the second switch transistor T2 are lightly doped drain switch transistors, which can also reduce the leakage current of the first switch transistor T1 and the leakage current of the second switch transistor T2, thus avoiding the influence on the display of the display panel due to the large leakage current of a transistor that is required to be turned off, in the case where an unnecessary switch transistor is required to be turned off in the embodiments of the present disclosure.

Figure 6:
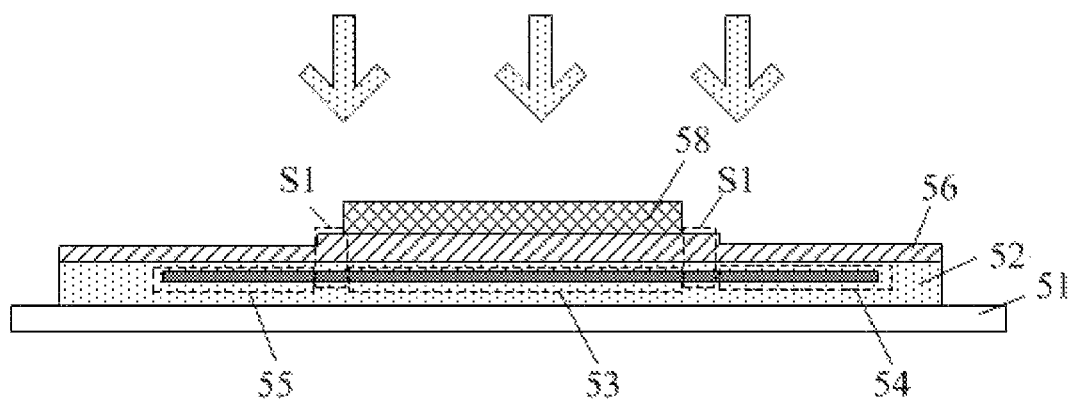
FIG. 6 is a structural schematic diagram of a switch transistor upon doping according to embodiments of the present disclosure.

FIG. 6 is a structural schematic diagram of a switch transistor upon doping according to an embodiment of the present disclosure. In a specific implementation, as illustrated in FIG. 6, in the process of manufacturing the first switch transistor T1 and/or the second switch transistor T2, a first insulating layer, a semiconductor layer, a second insulating layer, a shielding layer 56, and a gate electrode 58 may be sequentially formed on the base substrate 51, the first gate insulating layer and the second gate insulating layer constitute an insulating layer 52, and a thickness of the shielding layer 56 at the position corresponding to the gate electrode 58 and at the first regions S1 on both sides of the gate electrode 58 is greater than a thickness of the shielding layer 56 at other regions. Then, using the gate electrode 58 as a mask, the semiconductor layer is doped, because the thicknesses of the shielding layer 56 at different regions are different, so that a region, which corresponds to the gate electrode 58, of the semiconductor layer of the first switch transistor T1 and/or the second switch transistor T2 can be undoped to form an active layer 53, a region, which corresponds to the first region S1, of the semiconductor layer constitutes a lightly doped region, i.e., a second drain electrode doped region, and a heavily doped region, i.e., a first drain electrode doped region, is formed at other positions of the semiconductor layer, and two heavily doped regions located on both sides of the active layer 53 serve as a source electrode 54 and a drain electrode 55, respectively.

It should be noted that the above embodiments are described only by taking the case that the pixel circuit includes two switch transistors, one driving transistor, and one capacitor as an example, but in a specific implementation, the pixel circuit provided by the embodiments of the present disclosure can also include other components other than the above components, and the present disclosure is not limited thereto. For example, the pixel circuit of the present disclosure may also include other circuit components for compensating the threshold voltage of the first switch transistor T1, the threshold voltage of the second switch transistor T2, and the threshold voltage of the driving transistor T3, and other circuit components for resetting the driving transistor T3 and the light-emitting diode L, etc., as long as a pixel circuit structure includes the two switch transistors and their corresponding connection relationships provided by the embodiment of the present disclosure to achieve the switch between the horizontal axis function and the vertical axis function, the pixel circuit structure is within the protection scope of the present disclosure.

Based on the same inventive concept, the embodiments of the present disclosure also provide a display panel, which comprises a pixel array, the pixel array comprises a plurality of pixel units arranged in a plurality of rows and columns, and each pixel unit in the plurality of pixel units comprises the pixel circuit provided by any one of the above embodiments of the present disclosure.

Figure 7:
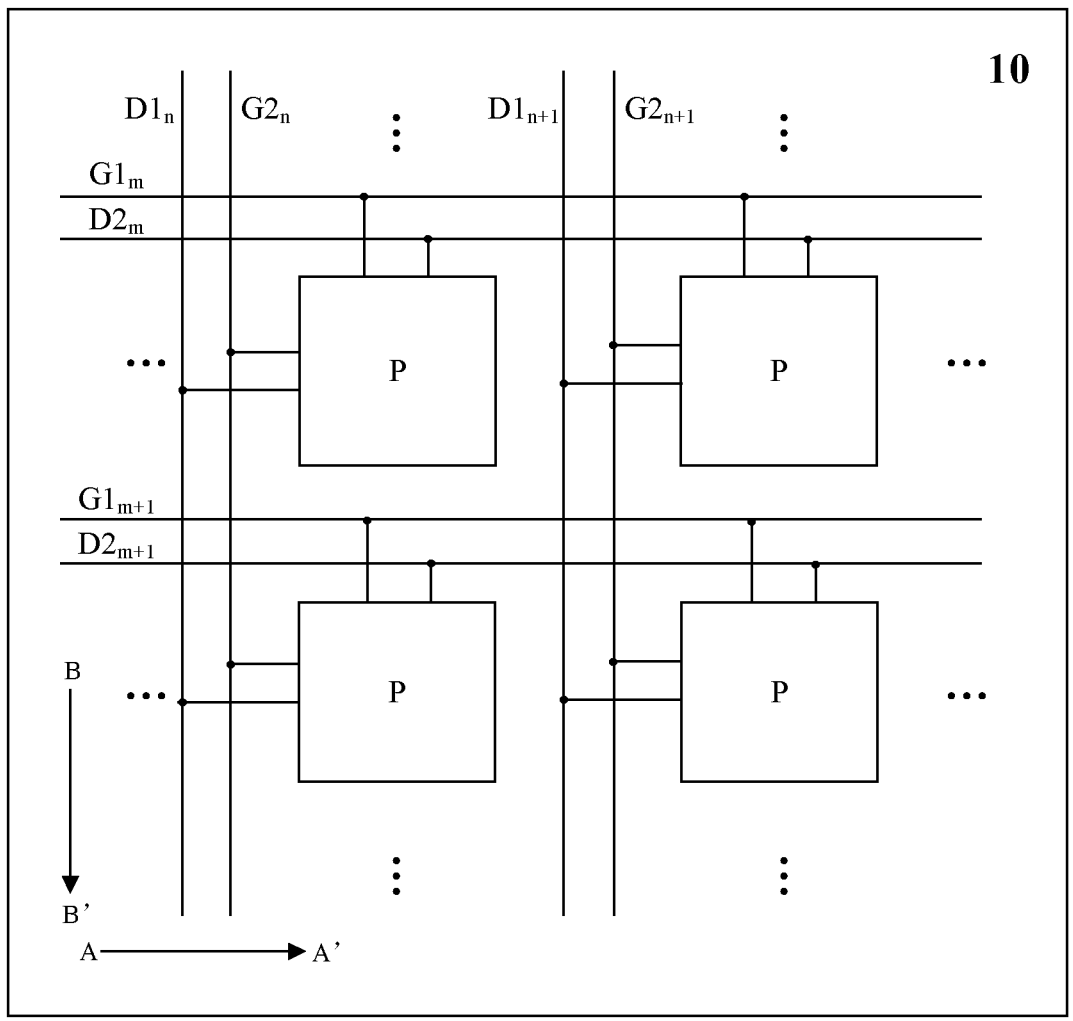
FIG. 7 is a structural schematic diagram of a display panel provided by embodiments of the present disclosure.

FIG. 7 is a structural schematic diagram of a display panel provided by embodiments of the present disclosure. Referring to FIG. 7, the display panel provided by the embodiment of the present disclosure includes a pixel array, and the pixel array includes a plurality of pixel units P arranged in the plurality of rows and columns, and each pixel unit P includes the pixel circuit provided by any one of the above embodiments of the present disclosure.

For example, as illustrated in FIG. 7, the first direction (as indicated by the arrow AA' in the figure) may be a row direction of the pixel array, and the second direction (as indicated by the arrow BB' in the figure) may be a column direction of the pixel array. In this case, pixel units P arranged in the same row in the first direction share the same first gate line G1 and the same second data line D2, and pixel units P arranged in the same column in the second direction share the same second gate line G2 and the same first data line D1.

For example, the plurality of rows of the pixel units P correspond to the plurality of first gate lines G1, respectively, and correspond to the plurality of second data lines D2 respectively, and the plurality of columns of the pixel units P correspond to the plurality of second gate lines D2, respectively, and correspond to the plurality of first data lines D1, respectively. FIG. 7 illustrates four pixel units P, and the four pixel units P are located in an m-th row and an n-th column, the m-th row and a (n+1)-th column, a (m+1)-th row and the n-th column, and the (m+1)-th row and the (n+1)-th column, respectively. Two pixel units P, which are respectively located in the m-th row and the n-th column and the m-th row and the (n+1)-th column, are connected to the same first gate line $G1_m$ and the same second data line $D2_m$, and two pixel units P, which are located in the (m+1)-th row and the n-th column and the (m+1)-th row and the (n+1)-th column, respectively, are connected to the same first gate line $G1_{m+1}$ and the same second data line $D2_{m+1}$. Two pixel units P, which are located in the m-th row and the n-th column and the (m+1)-th row and the n-th column, respectively, are connected to the same second gate line $G2_n$ and the same first data line $D1_n$, and two pixel units P, which are located in the m-th row and (n+1)-th column and the (m+1)-th row and the (n+1)-th column, respectively, are connected to the same second gate line $G2_{n+1}$ and the same first data line $D1_{n+1}$.

For example, during the landscape display, the first gate scanning signal may be provided to the pixel units P arranged in the same row along the first direction through the first gate line G1, and the first data signal may be provided to the pixel units P arranged in the same row along the first direction through the first data line D1; and during the portrait display, the second gate scanning signal may be provided to the pixel units P arranged in the same column along the second direction through the second gate line G2, and the second data signal may be provided to the pixel units P arranged in the same column along the second direction through the second data line D2.

For example, the first branch V1 of the power supply line V (not illustrated in FIG. 7) is electrically connected to the respective pixel units P arranged in the same row along the first direction, and the second branch V2 of the power supply line V is electrically connected to the respective pixel units P arranged in the same column along the second direction, so that during the landscape display, the power signal can be supplied to the respective pixel units P arranged in the same row along the first direction through the first branch V1 of the power supply line V; and during the portrait display, the power signal can be supplied to the respective pixel units P arranged in the same column along the second direction through the second branch V2 of the power supply line V.

It should be noted that in other embodiments, the first direction may also be the column direction of the pixel array, and the second direction may be the row direction of the pixel array.

In a specific implementation, each pixel unit P also includes a light-emitting element (not shown in the figures), the light-emitting element includes an anode, and a pattern of the anode is circular, square, or diamondoid. In the embodiment of the present disclosure, each light-emitting element comprises an anode, and the pattern of the anode is circular, square, or diamondoid, so that a light-emitting region where a single light-emitting element is located can also be circular, square, or diamondoid, and furthermore, the traditional source driving chip can be used for signal driving in the case where the display panel is viewed horizontally and vertically, so that the display panel can better achieve the switch between the horizontal display and the vertical display. Of course, the anode of the light-emitting element can also have other pattern shapes, and the present disclosure is not limited thereto.

Figure 8:
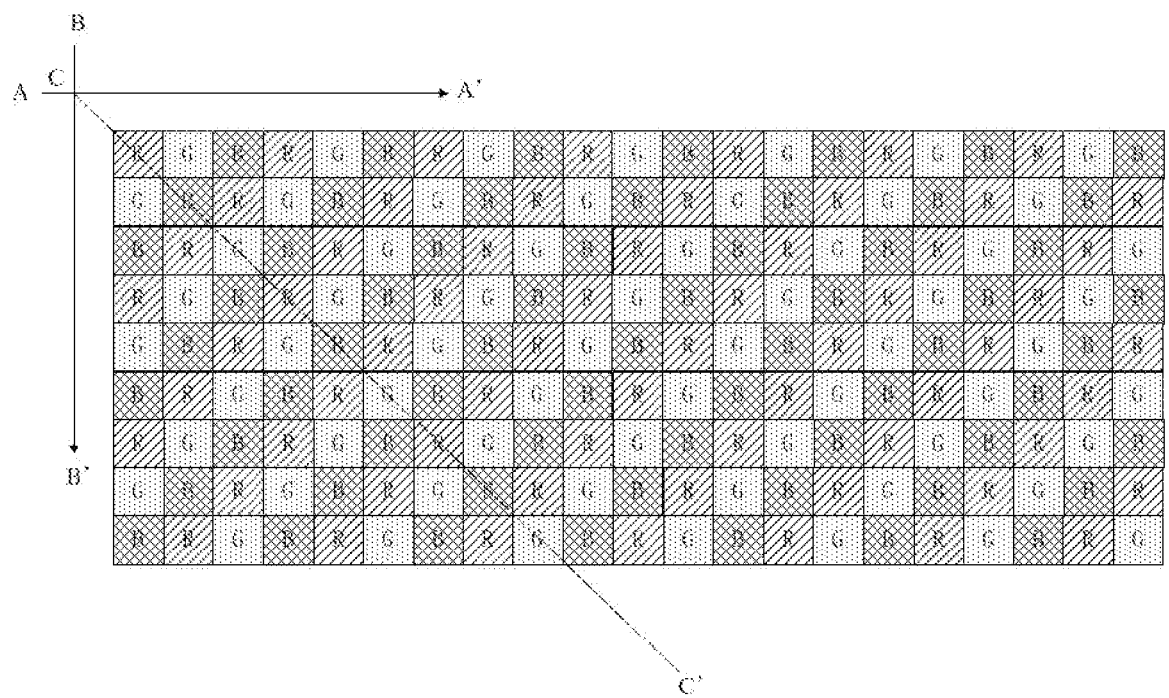
FIG. 8 is a structural schematic diagram of different pixel units, which have the same primary color, symmetrically distributed about a first axis provided by embodiments of the present disclosure.

FIG. 8 is a structural schematic diagram of different pixel units, which have the same primary color, symmetrically distributed about a first axis provided by embodiments of the present disclosure.

In a specific implementation, as illustrated in FIG. 8, the light-emitting elements, which emit light of the same color, in different pixel units are symmetrically distributed about a first axis CC', and the first axis CC' is an angular bisector of an included angle formed by the first direction AA' and the second direction BB' crossing with each other.

In the embodiments of the present disclosure, the light-emitting elements, which emit light of the same color, in different pixel units are symmetrically distributed about the first axis CC', that is, as illustrated in FIG. 8, the whole pixel units can be distributed as follows: the arrangement of the pixel units, which have different primary colors, in the first row is the same as the arrangement of the pixel units, which have different primary colors, in the first column (i.e., for example, the pixel units, which have different primary colors, in the first row are arranged in sequence as R-G-B-R-G-B-R-G-B . . . , the pixel units, which have different primary colors, in the first column are also arranged in sequence as R-G-B-R-G-B-R-G-B . . . ); the arrangement of pixel units, which have different primary colors, in the second row is the same as the arrangement of pixel units, which have different primary colors, in the second column (i.e., the pixel units, which have different primary colors, in the second row are arranged in sequence as G-B-R-G-B-R-G-B-R . . . , the pixel units, which have different primary colors, in the second column are also arranged in sequence as G-B-R-G-B-R-G-B-R . . . ); the arrangement of pixel units, which have different primary colors, in the third row is the same as the arrangement of pixel units, which have different primary colors, in the third column (i.e., the pixel units, which have different primary colors, in the third row are arranged in sequence as B-R-G-B-R-G-B-R-G . . . , the pixel units, which have different primary colors, in the third column are also arranged in sequence as B-R-G-B-R-G-B-R-G . . . ) . . . , that is, under the case where the display color of the pixel unit at a fixed position has been fixed, for the same source driving IC, whether the same source driving IC is electrically connected to the second data line extending along the first direction or electrically connected to the first data line extending along the second direction, pixel units with the primary color may correspond to the input data grayscale signals because the horizontal arrangement mode and the vertical arrangement mode of the pixel units with the primary color are the same, thereby improving the adaptability between the display panel and the source driving IC.

In a specific implementation, each pixel circuit corresponds to a pixel unit, in the case where each pixel unit emits light through a corresponding primary color light-emitting layer (i.e., for example, the pixel unit emitting red light emits light through a red light-emitting layer that can emit red light), the light-emitting elements, which emit light of the same color, in different pixel units are symmetrically distributed about the first axis, specifically, it means that primary color light-emitting layers emitting light of the same color are symmetrically distributed about the first axis; and in the case where each pixel unit emits light through a white light-emitting layer that emit white light and a color resist film layer (i.e., for example, a pixel unit that emits red light emits light through a light-emitting layer that can emit white light and a red color resist film layer), the light-emitting elements that emit light of the same color in different pixel units are symmetrically distributed about the first axis, specifically, it means that the color resist film layers of the same color are symmetrically distributed about the first axis.

Figure 9:
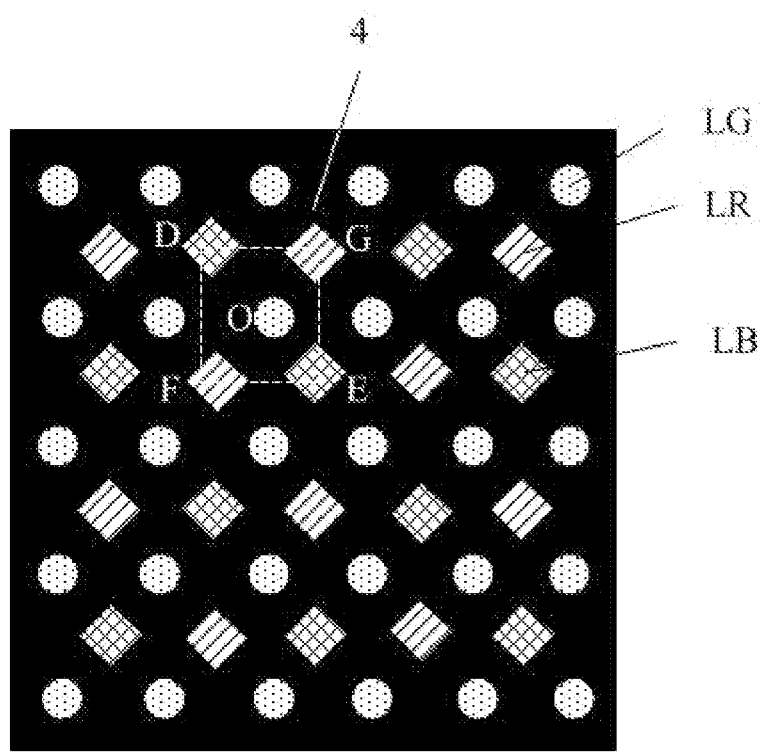
FIG. 9 is a schematic diagram of a specific arrangement structure of pixel units with different primary colors provided by embodiments of the present disclosure.

FIG. 9 is a schematic diagram of a specific arrangement structure of pixel units with different primary colors provided by embodiments of the present disclosure. As illustrated in FIG. 9, the display panel has a plurality of rectangular light-emitting regions 4, that is, shapes of the light-emitting regions on the display panel are rectangular; each rectangular light-emitting region 4 includes two pixel units emitting red light (corresponding to forming red pixel units LR), two pixel units emitting blue light (corresponding to forming blue pixel units LB), and one pixel unit emitting green light (corresponding to forming a green pixel unit LG). Each rectangular light-emitting region 4 has two first end points located at two ends of a first diagonal of each rectangular light-emitting region 4 and two second end points located at two ends of a second diagonal of each rectangular light-emitting region 4. Light-emitting elements in the two red pixel units LR emitting red light are located at two first end points of the rectangular light-emitting region 4 (e.g., points G and F in FIG. 9), respectively, light-emitting elements in the two blue pixel units LB emitting blue light are located at other two second ends of the rectangular light-emitting region 4 (e.g., points D and E in FIG. 9), respectively, and a light-emitting element in the green pixel unit LG emitting green light is located at a center position of the rectangular light-emitting region (e.g., at point O in FIG. 9). In a specific implementation, the light-emitting elements in the two red pixel units LR emitting red light can also be located at points D and E in FIG. 9, respectively, and the light-emitting elements in the two blue pixel units LB emitting blue light can also be located at points G and F in FIG. 9, respectively, the present disclosure is not limited to this case. The light-emitting regions on the display panel can also have other shapes, but it needs to be satisfied that the light-emitting elements in the pixel units with different light colors are integrally symmetrically distributed about the first axis.

In a specific implementation, in some embodiments, the light-emitting elements are light-emitting elements that emit white light, and a light-emitting side of each light-emitting element is correspondingly provided with an electrochromic layer.

Figures 10A, 10B:
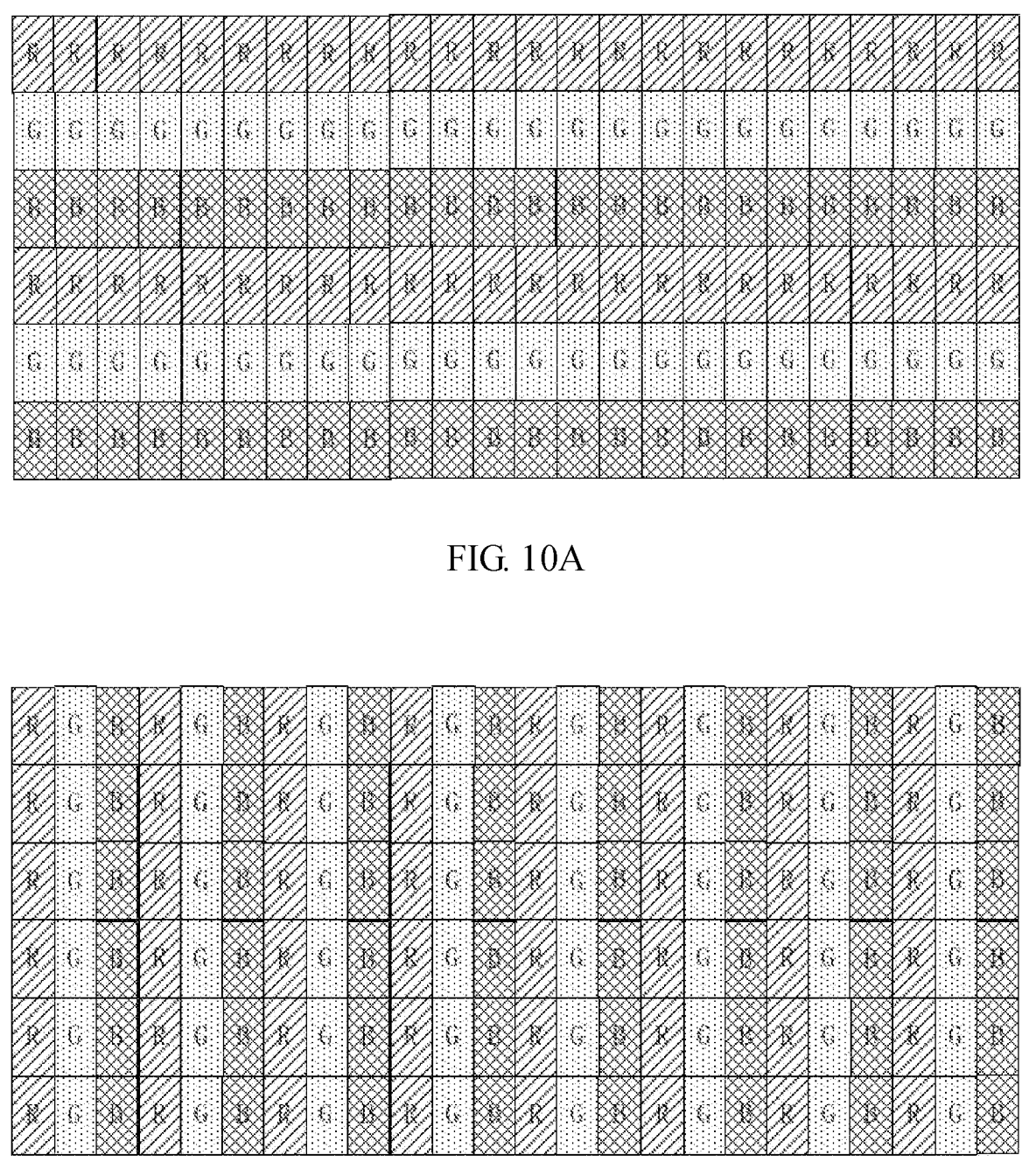

FIG. 10A is a schematic diagram of an arrangement structure of pixel units in a case where a first gate line is loaded with a first gate scanning signal and a first data line is loaded with a first data signal provided by embodiments of the present disclosure; and FIG. 10B is a schematic diagram of an arrangement structure of pixel units in a case where a second gate line is loaded with a second gate scanning signal and a second data line is loaded with a second data signal provided by embodiments of the present disclosure.

In the embodiments of the present disclosure, the light-emitting elements are light-emitting elements that emit white light, and a light-emitting side of each light-emitting element is also correspondingly provided with an electrochromic layer, and a color of the electrochromic layer corresponding to each light-emitting element can be independently controlled. For example, in different display modes (e.g., a horizontal display mode and a vertical display mode), the electrochromic layers corresponding to the light-emitting elements on the display panel present different color arrangements by running a set program. For example, in some embodiments, the color of the electrochromic layer can be controlled by a separate voltage control signal unit and a corresponding signal source.

For example, in the horizontal display mode, different voltage signals are applied to the electrochromic layers of the light-emitting elements in each column of the pixel units through separate voltage control signal units and corresponding signal sources, so that the electrochromic layers of the light-emitting elements in each column of the pixel units sequentially present red, green, and blue, therefore, in the horizontal display mode, that is to say, in the case where the first gate scanning signal is loaded on the first gate line and the first data signal is loaded on the first data line, the respective pixel units in each column may display red light, green light, and blue light in turn, as illustrated in FIG. 10A. In the vertical display mode, different voltage signals are applied to the electrochromic layers of the light-emitting elements in each row of the pixel units through separate voltage control signal units and corresponding signal sources, so that the electrochromic layers of the light-emitting elements in each row of the pixel units sequentially present red, green, and blue. Therefore, in the vertical display mode, that is, in the case where the second gate scanning signal is loaded on the second gate line and the second data signal is loaded on the second data line, the respective pixel units in each row may display red light, green light, and blue light in turn, as illustrated in FIG. 10B, that is, through the arrangement of the electrochromic layers, on the one hand, the arrangement mode of the pixel units with different primary colors is the same as the arrangement mode of the pixel units with conventional primary color in the prior art, so that the display panel can use the conventional source driving IC in the prior art, without customizing a special source driving IC, and the manufacturing cost is lower; and on the other hand, the same source driving IC can be electrically connected to both the second data line extending along the first direction and the first data line extending along the second direction. Because the directions of inputting data grayscale signals to the display panel are different in the case where the same source driving IC is connected to data lines extending along different directions, the electrochromic layers can be adjusted to obtain the arrangement of the pixel units with primary color matching the data grayscale signals, thus improving the adaptability between the display panel and the source driving IC.

In a specific implementation, the electrochromic layer can directly select electrochromic materials that can be converted among R, G, and B primary colors; the electrochromic layer may also include a plurality of stacked electrochromic sub-layers, so that the same pixel unit can achieve the conversion between different primary colors, that is, the electrochromic layer may include a first electrochromic sub-layer and a second electrochromic sub-layer, which are stacked with each other, and a color displayed by the first electrochromic sub-layer in a case where the first electrochromic sub-layer is powered on is different from a color displayed by the second electrochromic sub-layer in a case where the second electrochromic sub-layer is powered on.

Based on the same inventive concept, embodiments of the present disclosure also provide a display device, including the display panel provided by the embodiments of the present disclosure.

Figure 11:
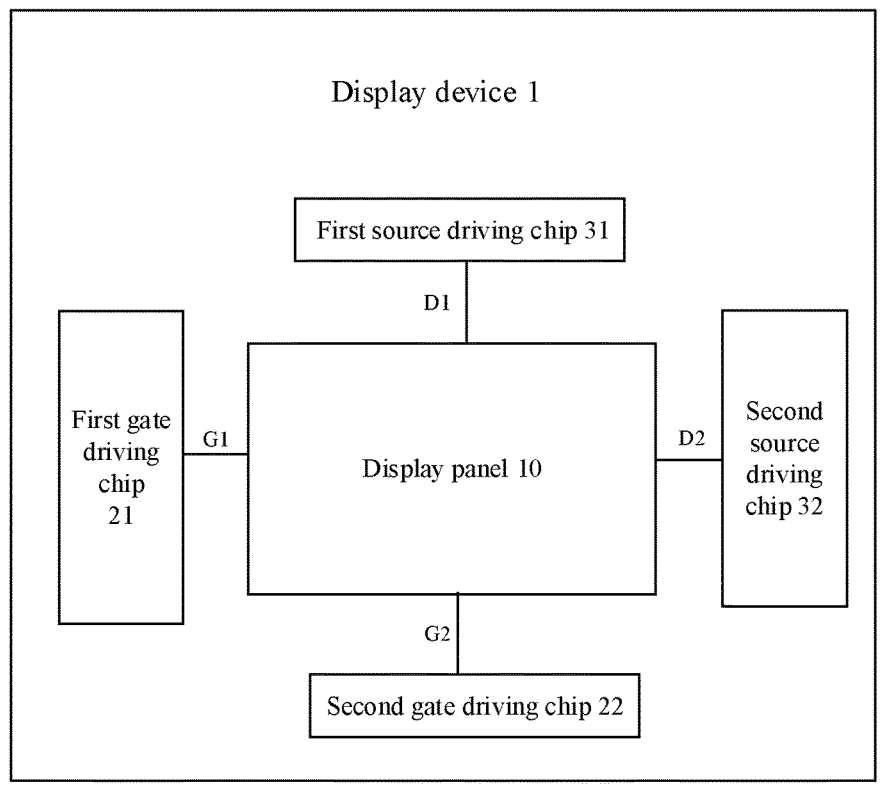
FIG. 11 is a structural schematic diagram of a display device provided by embodiments of the present disclosure.
Figure 12:
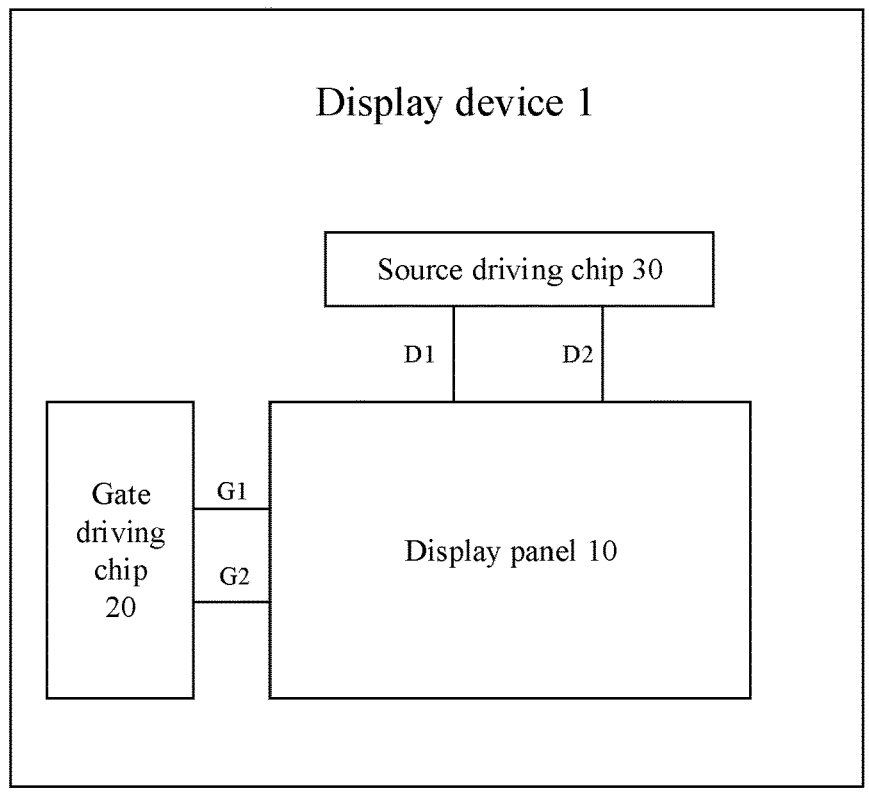
FIG. 12 is a structural schematic diagram of another display device provided by embodiments of the present disclosure.
Figure 13:
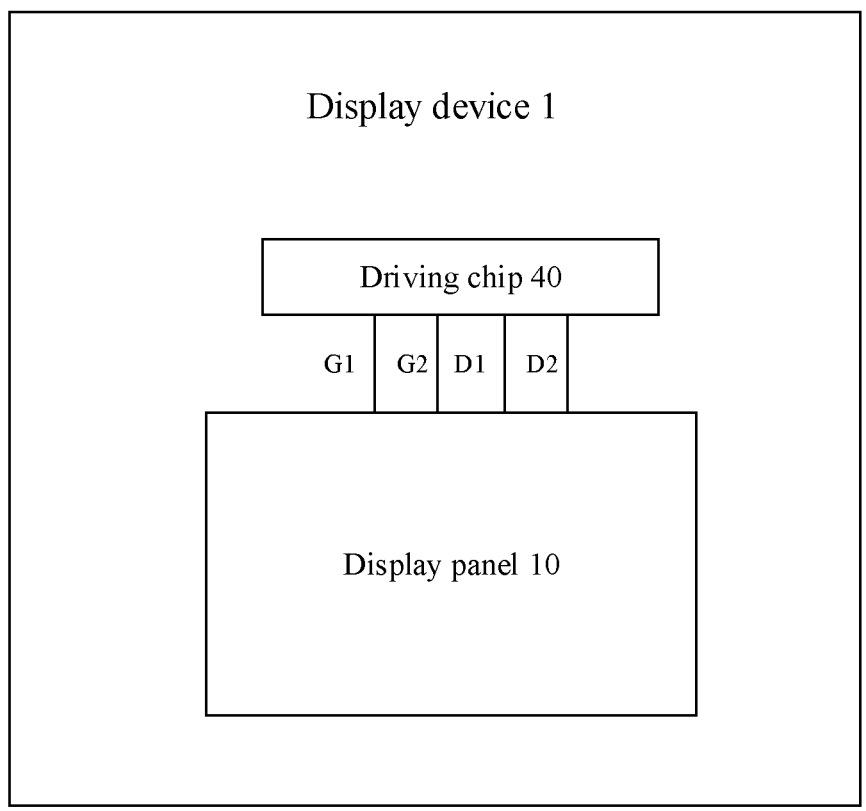
FIG. 13 is a structural schematic diagram of another display device provided by embodiments of the present disclosure.

FIG. 11 is a structural schematic diagram of a display device provided by embodiments of the present disclosure. FIG. 12 is another structural schematic diagram of a display device provided by embodiments of the present disclosure. FIG. 13 is another structural schematic diagram of a display device provided by embodiments of the present disclosure. Referring to FIGS. 11, 12, and 13, the display device 1 provided by the embodiments of the present disclosure includes the display panel 10 provided by the embodiments of the present disclosure.

In a specific implementation, referring to FIG. 11, in some embodiments, the display device 1 further includes a first gate driving chip 21, a second gate driving chip 22, a first source driving chip 31, and a second source driving chip. The first gate driving chip 21 is connected to the first gate line G1, the second gate driving chip 22 is connected to the second gate line G2, the first source driving chip 31 is connected to the first data line D1, and the second source driving chip 32 is connected to the second data line D2.

In the display device provided by the embodiments of the present disclosure, the first gate driving chip 21 is connected to the first gate line G1, the second gate driving chip 22 is connected to the second gate line G2, the first source driving chip 31 is connected to the first data line D1, and the second source driving chip 32 is connected to the second data line D2, that is, the signal lines extending along the first direction (the first gate line G1 and the second data signal line D2) can be electrically connected to either a gate driving chip (gate IC) or a source driving chip (source IC), and the signal lines extending along the second direction (the second gate line G2 and the first data signal line D1) can be electrically connected to either the gate driving chip or the source driving chip. In this case, the display panel of the embodiment of the present disclosure can use the gate IC or the source IC, the amount of which corresponds to the amount (number) of Pin, and can only select different functional ICs corresponding to the horizontal direction and vertical direction during IC/COF Bonding, so that the Portrait/Landscape mode of the final product can be determined. For example, the first gate driving chip 21 and the first source driving chip 31 are selected under a first preset condition (e.g., the horizontal display mode), the first gate driving chip 21 is configured to load a first gate scanning signal to the first gate line G1 under the first preset condition (e.g., the horizontal display mode), the first source driving chip 31 is configured to load a first data signal to the first data line D1 under the first preset condition (e.g., the horizontal display mode). The second gate driving chip 22 and the second source driving chip 32 are selected under a second preset condition (e.g., the vertical display mode), the second gate driving chip 22 is configured to load a second gate scanning signal to the second gate line G2 under the second preset condition (e.g., the vertical display mode), and the second source driving chip 32 is configured to load a second data signal to the second data line D2 under the second preset condition (e.g., the vertical display mode).

In a specific implementation, referring to FIG. 12, in other embodiments, the display device 1 includes a gate driving chip 20 and a source driving chip 30, the gate driving chip 20 is connected to the first gate line G1 and the second gate line G2, and the source driving chip 30 is connected to the first data line D1 and the second data line D2. The gate driving chip 20 is configured to load a first gate scanning signal to the first gate line G1 under a first preset condition (for example, the horizontal display mode), and is configured to load a second gate scanning signal to the second gate line G2 under a second preset condition (for example, the vertical display mode), the source driving chip 30 is configured to load a first data signal to the first data line D1 under the first preset condition (for example, the horizontal display mode), and is configured to load a second data signal to the second data line D2 under the second preset condition (for example, the vertical display mode).

In a specific implementation, referring to FIG. 13, in other embodiments, the display device 1 includes a driving chip 40, the driving chip 40 is coupled to the first gate line G1, the first data line D1, the second gate line G2, and the second data line D2, and the driving chip 40 is configured to load a first gate scanning signal to the first gate line G1 and load a first data signal D1 to the first data line under a first preset condition (for example, the horizontal display mode), and is configured to load a second gate scanning signal to the second gate line G2 and load a second data signal to the second data line D2 under a second preset condition (for example, the vertical display mode).

In the display device provided by the embodiments of the present disclosure, the driving chip can also be a driving chip integrating the gate driving function and the source driving function simultaneously, so that different signals can be transmitted by the same signal line through function switch, that is, the display panel of the embodiments of the present disclosure can be matched with a custom driving chip IC with dual functions of Gate/Source, and function selection signals are given by a Tcon IC (Timer control register IC), so as to switch between Portrait/Landscape modes in real time in actual use.

The embodiments of the present disclosure has the follow beneficial effects: in the pixel circuit provide by the embodiments of the present disclosure, the first gate line and the second data line extend along the first direction, the second gate line and the first data line extend along the second direction, so that the signal line extending along the first direction can transmit both the gate scanning signal and the data grayscale signal, the signal line extending along the second direction can transmit both the gate scanning signal and the data grayscale signal. In the case where the signal lines are electrically connected to the source driving IC and the gate driving IC, the signal line extending along the first direction can be connected to both the gate driving IC and the source driving IC, the signal line extending along the second direction can also be connected to both the gate driving IC and the source driving IC, that is, it supports free switch of the horizontal axis function and the vertical axis function (i.e., achieving the switch between Portrait and Landscape), which increases the freedom and flexibility of production design, so that the display panel with the manufactured circuit lines can adapt to more video sources, be applied to more application scenarios, and have more display modes.

Although detailed description has been given above to the present disclosure with general descriptions and specific implementations, it shall be apparent to those skilled in the art that some modifications or improvements may be made on the basis of the embodiments of the present disclosure. Therefore, all the modifications or improvements made without departing from the spirit of the present disclosure shall all fall within the scope of protection of the present disclosure.

What is claimed is:

1. A display panel, comprising a pixel array,
   wherein the pixel array comprises a plurality of pixel units arranged in a plurality of rows and columns, and each pixel unit of the plurality of pixel units comprises a pixel circuit, and an arrangement of pixel units, which have different primary colors, in a first row is the same as an arrangement of pixel units, which have different primary colors, in a first column, the pixel circuit comprises: a first switch circuit, a second switch circuit, a driving circuit, a first gate line, a first data line, a second gate line, and a second data line, wherein a control terminal of the first switch circuit is connected to the first gate line, a first terminal of the first switch circuit is connected to the first data line, and a second terminal of the first switch circuit is connected to a control terminal of the driving circuit;

a control terminal of the second switch circuit is connected to the second gate line, a first terminal of the second switch circuit is connected to the second data line, and a second terminal of the second switch circuit is connected to the control terminal of the driving circuit;

the driving circuit is connected to a light-emitting element, and is configured to drive the light-emitting element to emit light; and the first gate line and the second data line extend along a first direction, the second gate line and the first data line extend along a second direction, and the first direction and the second direction cross each other, wherein the first switch circuit comprises a first switch transistor, and the first switch transistor comprises a gate electrode, a shielding layer, a gate insulating layer and a semiconductor layer comprising a first drain electrode doped region, a second drain electrode doped region, and a channel region, the shielding layer is located on a side of the gate electrode close to the semiconductor layer, and the gate insulating layer is located between the shielding layer and the semiconductor layer;

the second drain electrode doped region is located between the first drain electrode doped region and the channel region, and the shielding layer has a first portion, a second portion and a third portion, the first portion is located between the gate electrode and the channel region, the second portion is located on a side of the first portion and at a position corresponding to the second drain electrode doped region, and the third portion is located on a side of the second portion away from the first portion and at a position corresponding to the first drain electrode doped region, wherein a thickness of the first portion and the second portion of the shielding layer is greater than a thickness of the third portion of the shielding layer.

2. The display panel according to claim 1, wherein the first gate line and the second data line are a single signal line.

3. The display panel according to claim 1, wherein the second gate line and the first data line are a single signal line.

4. The display panel according to claim 1, wherein the driving circuit is further connected to a power supply line, and the power supply line comprises a first branch extending along the first direction and a second branch extending along the second direction.

5. The display panel according to claim 1, further comprising a storage circuit,
   wherein a first terminal of the storage circuit is connected to the control terminal of the driving circuit, and a second terminal of the storage circuit is connected to a first terminal of the driving circuit.

6. The display panel according to claim 5, wherein the second switch circuit comprises a second switch transistor, the driving circuit comprises a driving transistor, and the storage circuit comprises a capacitor, the gate electrode of the first switch transistor serves as the control terminal of the first switch circuit, a first electrode of the first switch transistor serves as the first terminal of the first switch circuit, and a second electrode of the first switch transistor serves as the second terminal of the first switch circuit;

a gate electrode of the second switch transistor serves as the control terminal of the second switch circuit, a first electrode of the second switch transistor serves as the first terminal of the second switch circuit, and a second electrode of the second switch transistor serves as the second terminal of the second switch circuit;

a gate electrode of the driving transistor serves as the control terminal of the driving circuit, a first electrode of the driving transistor is connected to a power supply line, and a second electrode of the driving transistor is connected to the light-emitting element; and a first terminal of the capacitor serves as the first terminal of the storage circuit, and a second terminal of the capacitor serves as the second terminal of the storage circuit.

7. The display panel according to claim 6, wherein the first switch transistor is a double-gate switch transistor, or the second switch transistor is a double-gate switch transistor, or both the first switch transistor and the second switch transistor are double-gate switch transistors.

8. The display panel according to claim 6, wherein the second switch transistor comprises a first drain electrode doped region, a second drain electrode doped region, and a channel region;

compared with the first drain electrode doped region of the second switch transistor, the second drain electrode doped region of the second switch transistor is closer to the channel region of the second switch transistor; and a doping concentration of the second drain electrode doped region of the first switch transistor is lower than a doping concentration of the first drain electrode doped region of the first switch transistor, or a doping concentration of the second drain electrode doped region of the second switch transistor is lower than a doping concentration of the first drain electrode doped region of the second switch transistor; or the doping concentration of the second drain electrode doped region of the first switch transistor is lower than the doping concentration of the first drain electrode doped region of the first switch transistor, and the doping concentration of the second drain electrode doped region of the second switch transistor is lower than the doping concentration of the first drain electrode doped region of the second switch transistor.

9. The display panel according to claim 2, wherein the second gate line and the first data line are a single signal line.

10. A display panel, comprising a pixel array, wherein the pixel array comprises a plurality of pixel units arranged in a plurality of rows and columns, and each pixel unit of the plurality of pixel units comprises a pixel circuit, the pixel circuit comprises: a first switch circuit, a second switch circuit, a driving circuit, a first gate line, a first data line, a second gate line, and a second data line, wherein a control terminal of the first switch circuit is connected to the first gate line, a first terminal of the first switch circuit is connected to the first data line, and a second terminal of the first switch circuit is connected to a control terminal of the driving circuit;

a control terminal of the second switch circuit is connected to the second gate line, a first terminal of the second switch circuit is connected to the second data line, and a second terminal of the second switch circuit is connected to the control terminal of the driving circuit;

the driving circuit is connected to a light-emitting element, and is configured to drive the light-emitting element to emit light; and the first gate line and the second data line extend along a first direction, the second gate line and the first data line extend along a second direction, and the first direction and the second direction cross each other, wherein each pixel unit of the plurality of pixel units further comprises the light-emitting element, wherein the first switch circuit comprises a first switch transistor, and the first switch transistor comprises a gate electrode, a shielding layer, a gate insulating layer and a semiconductor layer comprising a first drain electrode doped region, a second drain electrode doped region, and a channel region, the shielding layer is located on a side of the gate electrode close to the semiconductor layer, and the gate insulating layer is located between the shielding layer and the semiconductor layer;

the second drain electrode doped region is located between the first drain electrode doped region and the channel region, and the shielding layer has a first portion, a second portion and a third portion, the first portion is located between the gate electrode and the channel region, the second portion is located on a side of the first portion and at a position corresponding to the second drain electrode doped region, and the third portion is located on a side of the second portion away from the first portion and at a position corresponding to the first drain electrode doped region, wherein a thickness of the first portion and the second portion of the shielding layer is greater than a thickness of the third portion of the shielding layer.

11. The display panel according to claim 10, wherein pixel units arranged in a same row along the first direction share a same first gate line and a same second data line, and pixel units arranged in a same column along the second direction share a same second gate line and a same first data line.

12. The display panel according to claim 10, wherein the display panel has a plurality of rectangular light-emitting regions, each rectangular light-emitting region comprises two pixel units emitting red light, two pixel units emitting blue light, and one pixel unit emitting green light, each rectangular light-emitting region has two first end points located at two ends of a first diagonal of each rectangular light-emitting region and two second end points located at two ends of a second diagonal of each rectangular light-emitting region, light-emitting elements in the two pixel units emitting the red light are at the two first end points of each rectangular light-emitting region, respectively, light-emitting elements in the two pixel units emitting the blue light are at the two second end points of each rectangular light-emitting region, respectively, and a light-emitting element in the pixel unit emitting the green light is at a central position of each rectangular light-emitting region.

13. The display panel according to claim 10, wherein the light-emitting element of each pixel unit is a light-emitting element emitting white light, and an electrochromic layer is correspondingly disposed on a light-emitting side of the light-emitting element of each pixel unit.

14. The display panel according to claim 13, wherein the electrochromic layer comprises a first electrochromic sub-layer and a second electrochromic sub-layer, and a color displayed by the first electrochromic sub-layer in a case where the first electrochromic sub-layer is powered on is different from a color displayed by the second electrochromic sub-layer in a case where the second electrochromic sub-layer is powered on.

15. The display panel according to claim 10, wherein
light-emitting elements, which emit light of a same color, in different pixel units of the plurality of pixel units are symmetrically distributed about a first axis, and the first axis is an angular bisector of an included angle formed by the first direction and the second direction crossing with each other, and
an arrangement of pixel units, which have different primary colors, in a first row is the same as an arrangement of pixel units, which have different primary colors, in a first column.

16. A display device, comprising a display panel,
wherein the display panel comprises a pixel array, the pixel array comprises a plurality of pixel units arranged in a plurality of rows and columns, and each pixel unit of the plurality of pixel units comprises a pixel circuit,
the pixel circuit comprises: a first switch circuit, a second switch circuit, a driving circuit, a first gate line, a first data line, a second gate line, and a second data line,
wherein a control terminal of the first switch circuit is connected to the first gate line, a first terminal of the first switch circuit is connected to the first data line, and a second terminal of the first switch circuit is connected to a control terminal of the driving circuit;
a control terminal of the second switch circuit is connected to the second gate line, a first terminal of the second switch circuit is connected to the second data line, and a second terminal of the second switch circuit is connected to the control terminal of the driving circuit;
the driving circuit is connected to a light-emitting element, and is configured to drive the light-emitting element to emit light; and
the first gate line and the second data line extend along a first direction, the second gate line and the first data line extend along a second direction, and the first direction and the second direction cross each other,
wherein the first switch circuit comprises a first switch transistor, and the first switch transistor comprises a gate electrode, a shielding layer, a gate insulating layer and a semiconductor layer comprising a first drain electrode doped region, a second drain electrode doped region, and a channel region, the shielding layer is located on a side of the gate electrode close to the semiconductor layer, and the gate insulating layer is located between the shielding layer and the semiconductor layer;
the second drain electrode doped region is located between the first drain electrode doped region and the channel region, and the shielding layer has a first portion, a second portion and a third portion, the first portion is located between the gate electrode and the channel region, the second portion is located on a side of the first portion and at a position corresponding to the second drain electrode doped region, and the third portion is located on a side of the second portion away from the first portion and at a position corresponding to the first drain electrode doped region,
wherein a thickness of the first portion and the second portion of the shielding layer is greater than a thickness of the third portion of the shielding layer.

17. The display device according to claim 16, further comprising a first gate driving chip, a first source driving chip, a second gate driving chip, and a second source driving chip,
wherein the first gate driving chip is connected to the first gate line, and is configured to load a gate scanning signal to the first gate line under a first preset condition;
the first source driving chip is connected to the first data line, and is configured to load a first data signal to the first data line under the first preset condition;
the second gate driving chip is connected to the second gate line, and is configured to load a second gate scanning signal to the second gate line under a second preset condition; and
the second source driving chip is connected to the second data line, and is configured to load a second data signal to the second data line under the second preset condition.

18. The display device according to claim 16, further comprising a gate driving chip and a source driving chip,
wherein the gate driving chip is connected to the first gate line and the second gate line, and is configured to load a first gate scanning signal to the first gate line under a first preset condition and configured to load a second gate scanning signal to the second gate line under a second preset condition; and
the source driving chip is connected to the first data line and the second data line, and is configured to load a first data signal to the first data line under the first preset condition and load a second data signal to the second data line under the second preset condition.

19. The display device according to claim 16, further comprising a driving chip,
wherein the driving chip is connected to the first gate line, the first data line, the second gate line, and the second data line, and the driving chip is configured to load a first gate scanning signal to the first gate line and load a first data signal to the first data line under a first preset condition, and is configured to load a second gate scanning signal to the second gate line and load a second data signal to the second data line under a second preset condition.

* * * * *